(12) United States Patent
Aoshima (10) Patent No.: US 11,789,397 B2
(45) Date of Patent: Oct. 17, 2023

(54) DRIVE APPARATUS AND AN IMAGING SYSTEM

(71) Applicant: HEWLETT-PACKARD DEVELOPMENT COMPANY, L.P., Spring, TX (US)

(72) Inventor: Yuji Aoshima, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 210 days.

(21) Appl. No.: 17/299,253

(22) PCT Filed: Nov. 20, 2019

(86) PCT No.: PCT/US2019/062405
§ 371 (c)(1),
(2) Date: Jun. 2, 2021

(87) PCT Pub. No.: WO2020/154029
PCT Pub. Date: Jul. 30, 2020

(65) Prior Publication Data
US 2022/0057738 A1    Feb. 24, 2022

(30) Foreign Application Priority Data

Jan. 21, 2019    (JP) ................................. 2019-007645

(51) Int. Cl.
*G03G 15/00* (2006.01)
*B65H 5/02* (2006.01)
(Continued)

(52) U.S. Cl.
CPC ......... *G03G 15/6529* (2013.01); *B65H 5/021* (2013.01); *G03G 15/1615* (2013.01);
(Continued)

(58) Field of Classification Search
CPC ........... G03G 15/6529; G03G 15/1615; G03G 2215/00156; B65H 5/021; B65H 2404/252; B65H 2404/253; B65H 2404/2532
See application file for complete search history.

(56) References Cited

U.S. PATENT DOCUMENTS 8,792,812 B2 * 7/2014 Fujioka ................ G03G 15/755
399/165
11,143,988 B2 * 10/2021 Miyake ............. G03G 15/1615
(Continued)

FOREIGN PATENT DOCUMENTS

CN     102050338 A    5/2011
CN     107229207 A    10/2017
(Continued)

*Primary Examiner* — Ryan D Walsh
(74) *Attorney, Agent, or Firm* — Foley & Lardner LLP (57) ABSTRACT

A driving apparatus includes an endless belt, a belt roller which engages the endless belt, a steering member and an adjustment member. The belt roller has a rotation shaft. The steering member contacts the endless belt at the inner side of the endless belt. The adjustment member is supported rotatably. The adjustment member receives a force in response to the endless belt moving in a longitudinal direction of the rotation shaft of the belt roller, and generates a pressing force that tilts the steering member via a rotational movement of the adjustment member.

15 Claims, 7 Drawing Sheets

(51) Int. Cl.
  *G03G 5/16* (2006.01)
  *G03G 15/16* (2006.01)
(52) U.S. Cl.
  CPC .. *B65H 2404/252* (2013.01); *B65H 2404/253* (2013.01); *B65H 2404/2532* (2013.01); *G03G 2215/00156* (2013.01)

(56) References Cited

U.S. PATENT DOCUMENTS

| | | | | |
|---|---|---|---|---|
| 11,169,470 | B2 * | 11/2021 | Miyake | G03G 15/6567 |
| 11,169,471 | B2 * | 11/2021 | Aoshima | G03G 15/1615 |
| 11,269,270 | B2 * | 3/2022 | Miyake | B65G 39/16 |
| 11,327,419 | B2 * | 5/2022 | Hori | G03G 15/1615 |
| 11,334,005 | B2 * | 5/2022 | Miyake | G03G 15/161 |
| 11,422,487 | B2 * | 8/2022 | Nakajima | G03G 15/1615 |
| 2010/0247170 | A1 * | 9/2010 | Nakamura | G03G 15/00 399/302 |
| 2011/0110691 | A1 | 5/2011 | Hirose et al. | |
| 2012/0027478 | A1 | 2/2012 | Tsukioka | |
| 2012/0234656 | A1 | 9/2012 | Yamaoka | |
| 2013/0084110 | A1 | 4/2013 | Fujioka | |
| 2013/0216283 | A1 | 8/2013 | Nakajima | |
| 2013/0306441 | A1 | 11/2013 | Asaoka et al. | |
| 2017/0227921 | A1 | 8/2017 | Kawashima et al. | |
| 2017/0275111 | A1 | 9/2017 | Nakajima | |
| 2018/0120739 | A1 | 5/2018 | Hozumi | |
| 2018/0267437 | A1 * | 9/2018 | Hozumi | G03G 15/0136 |

FOREIGN PATENT DOCUMENTS

| | | |
|---|---|---|
| CN | 107856411 A | 3/2018 |
| EP | 0974876 A1 | 1/2000 |
| EP | 3196036 A1 | 7/2017 |
| JP | 11-344906 A | 12/1999 |
| JP | 2008268954 | 11/2008 |
| JP | 2015156044 | 8/2016 |
| JP | 2016200766 | 12/2016 |
| KR | 200196367 Y1 | 9/2000 |
| WO | 2019/088494 A1 | 5/2019 |

* cited by examiner

Fig.2

DRIVE APPARATUS AND AN IMAGING SYSTEM

CROSS REFERENCE TO RELATED APPLICATIONS

This application is filed under 35 U.S.C. § 371 as a National Stage of PCT International Application No. PCT/US2019/062405, filed on Nov. 20, 2019, in the U.S. Patent and Trademark Office, which claims the priority benefit of Japanese Patent Application No. 2019-007645, filed on Jan. 21, 2019, in the Japanese Patent Office. The disclosures of PCT International Application No. PCT/US2019/062405 and Japanese Patent Application No. 2019-007645 are incorporated by reference herein in their entireties.

BACKGROUND

In some image forming systems, an endless belt is used as an intermediate transfer belt for secondarily transferring a toner image. The endless belt engages with a tension roller and is driven along a rotational path. When the endless belt meanders in the longitudinal direction of the tension roller, the arrangement of the endless belt is corrected by inclining a steering roller disposed inside the endless belt.

DETAILED DESCRIPTION

In the following description, with reference to the drawings, the same reference numbers are assigned to the same components or to similar components having the same function, and overlapping description is omitted. With reference to the XYZ orthogonal coordinate system illustrated in the drawings, the X direction may indicate a width direction, the Y direction may indicate a front-to-rear direction, and the Z direction may indicate an up-to-down direction.

Figure 1:
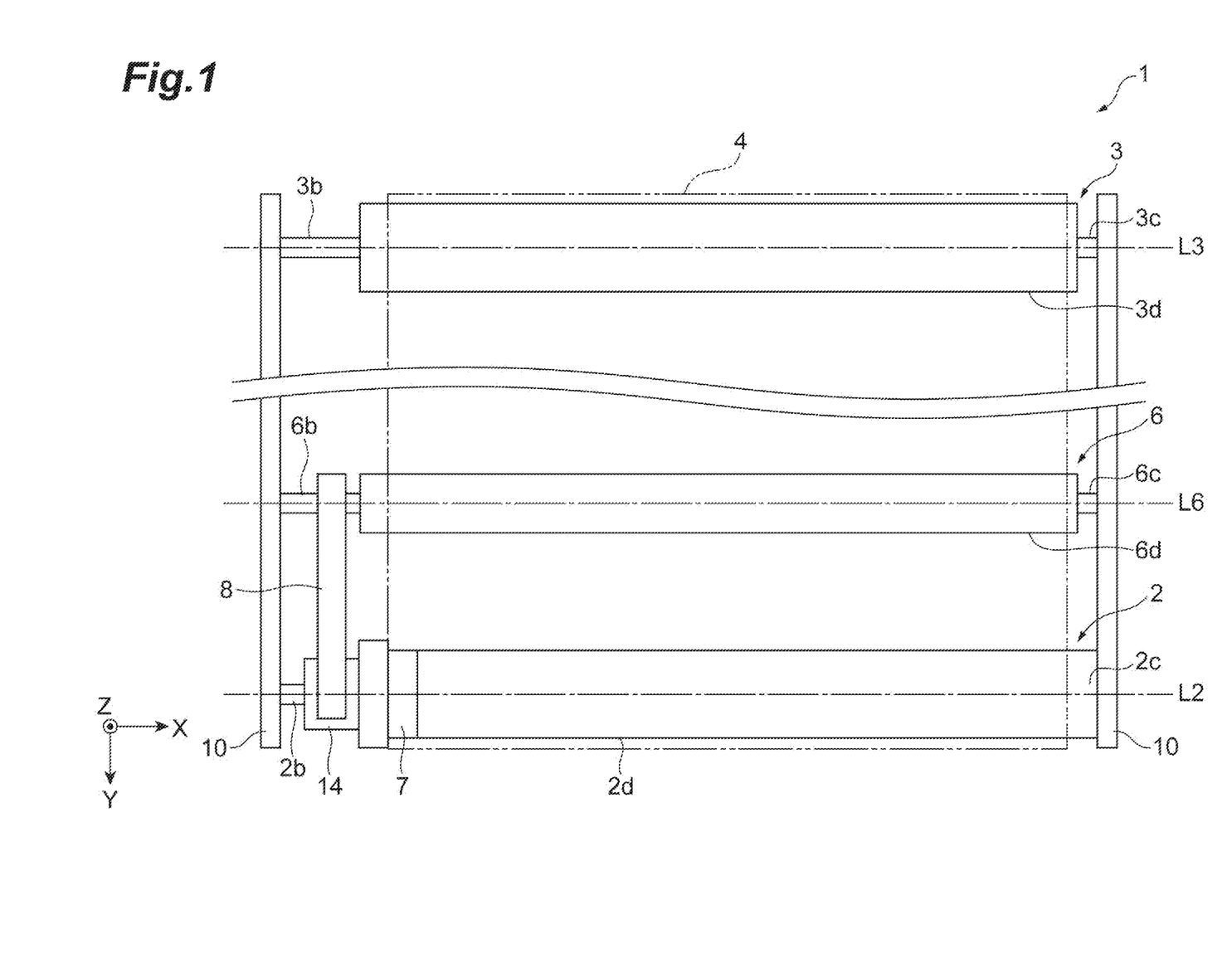
FIG. 1 is a plan view illustrating an example of a belt driving device.
Figure 2:
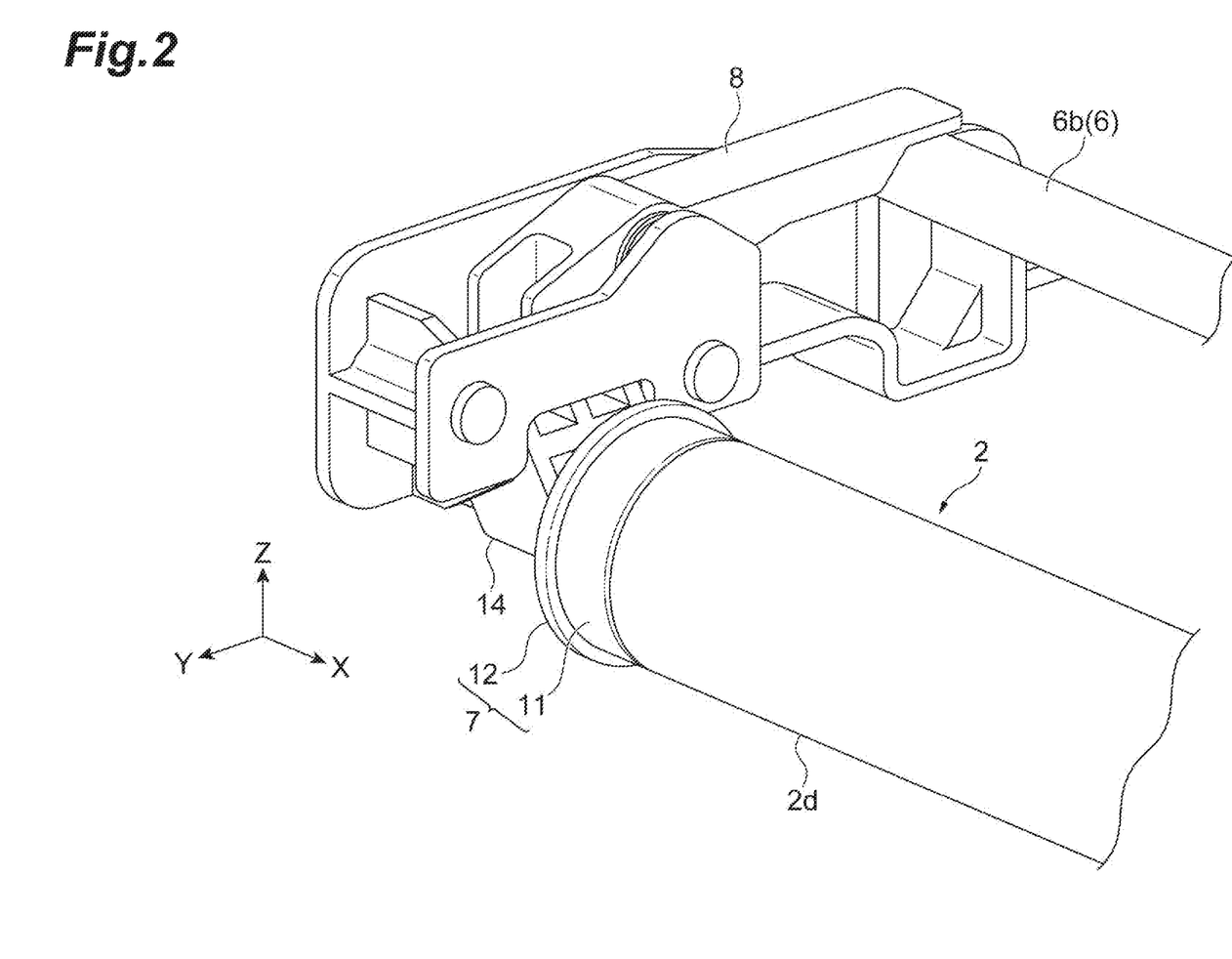
FIG. 2 is a perspective view of an end part structure of the example belt driving device.

With reference to FIG. 1, an example belt driving device 1 may include an endless belt 4, a tension roller 2 (a belt roller), a tension roller 3 (a driven roller), a steering roller 6 (a steering member), an adjustment member 14, and a link mechanism 8. The relative positional relationship, shape, and the like of the configurations illustrated in FIG. 1 are schematic. The example belt driving device 1 can be used as a transfer device which secondarily transfers a toner image developed by a developing device in an example image forming system such as a printer. In the transfer device, the endless belt 4 can function as an intermediate transfer belt. Further, the belt driving device 1 can be used as a sheet conveying device which conveys a sheet. In the sheet conveying device, the endless belt 4 can function as a sheet conveying belt.

In some examples, the endless belt 4 is stretched over the tension roller 2 disposed at one end in the Y direction and the tension roller 3 disposed at the other end in the Y direction. The belt driving device 1 may include other tension rollers for tensioning the endless belt 4. The tension roller 2 and the tension roller 3 extend in the X direction and are disposed to face each other (e.g., from opposite ends of the endless belt) in the Y direction intersecting the X direction. A direction intersecting the X direction and the Y direction may be set as the Z direction. The tension roller 2 may include a cylindrical roller body 2d which is provided inside the endless belt 4 and engages with the endless belt 4, and rotation shafts 2b and 2c which protrude from the roller body 2d in the X direction. The outer diameters of the rotation shafts 2b and 2c of the tension roller 2 are smaller than the outer diameter of the roller body 2d of the tension roller 2. The tension roller 3 may include a cylindrical roller body 3d which is provided inside the endless belt 4 and engages with the endless belt 4, and rotation shafts 3b and 3c which protrude from the roller body 3d in the X direction.

The tension roller 2 may rotate about an axis L2 along the X direction by power transmitted from an electric motor (not illustrated). The endless belt 4 may move along a rotational path as the tension roller 2 rotates. The tension roller 3 may rotate about an axis L3 as the endless belt 4 moves in a circulating manner. Bearings supporting the tension rollers 2 and 3 may be located at both sides in the X direction to be supported by a frame 10 extending in the Y direction. In some examples, power may be transmitted from the electric motor to the tension roller 3 instead of the tension roller 2. In some examples, the endless belt 4 moves in a circulating manner as the tension roller 3 rotates and the tension roller 2 rotates as the endless belt 4 rotates.

The steering roller 6 may be located at a position separated from (e.g., spaced apart from) the tension roller 2 at the inside the endless belt 4. For example, the steering roller 6 may be disposed between the tension roller 2 and the tension roller 3 in the Y direction. In some examples, the steering roller 6 is disposed at a position close to the tension roller 2 in relation to the tension roller 3 in the Y direction. The steering roller 6 may be disposed to come into contact with the inner circumferential surface of the endless belt 4 moving from the tension roller 3 toward the tension roller 2.

In some examples, the steering roller 6 includes a cylindrical roller body 6d which is provided inside the endless belt 4 and comes into contact with the endless belt 4, and rotation shafts 6b and 6c (steering rotation shafts) which protrude from the roller body 6d in the X direction. The steering roller 6 rotates about an axis L6 in a driven manner as the endless belt 4 moves in a circulating manner. The rotation shafts 6b and 6c of the steering roller 6 are supported by a roller holding member (not illustrated) provided separately from the frame 10. The rotation shafts 6b and 6c of the steering roller 6 can be displaced in the Z direction by using a center of a roller holding member (not illustrated) as a fulcrum in each roller holding member. For example, the steering roller 6 can be tilted by using a center of a roller holding member (not illustrated) as a fulcrum. Various other mechanisms can be used as a tilting mechanism of the steering roller 6. In some examples, the steering roller may be tilted by using a center in the Y direction as a fulcrum.

Figure 3:
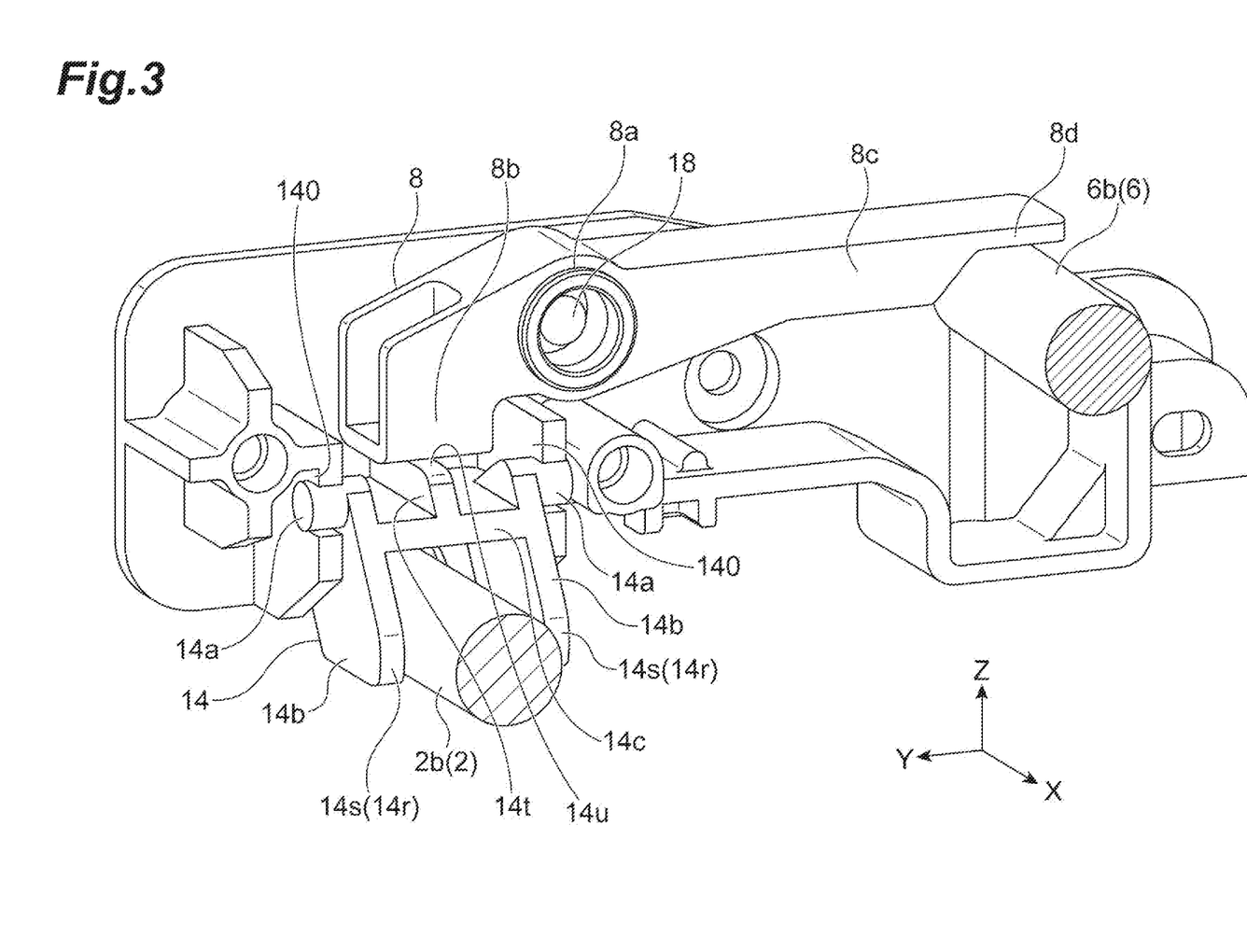
FIG. 3 is a perspective view of the example end part structure.

With reference to FIGS. 2 to 6(b), an example adjustment member 14 of an example the belt driving device 1, is disposed along the rotation shaft 2b of the tension roller 2 at the outside of the roller body 2d in the X direction. The adjustment member 14 is spaced apart from the rotation shaft 2b in order to avoid a contact with the rotation shaft 2b (FIGS. 3 and 5A). A pulley 7 (a transmission member) is disposed between the adjustment member 14 and the roller body 2d of the tension roller 2 in the X direction. The pulley 7 is attached to the rotation shaft 2b of the tension roller 2 and engages with the endless belt 4. The rotation shaft 2b of the tension roller 2 is inserted through the pulley 7 (see FIG. 4(a)).

Figure 4A:
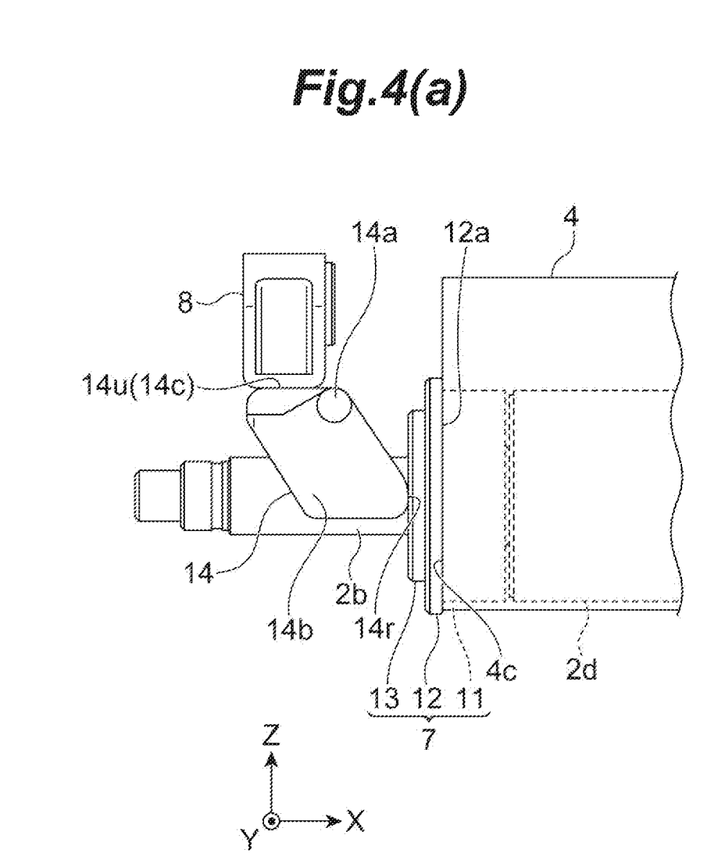
FIG. 4(a) is a side view of the example end part structure in a first operational state.
Figure 4B:
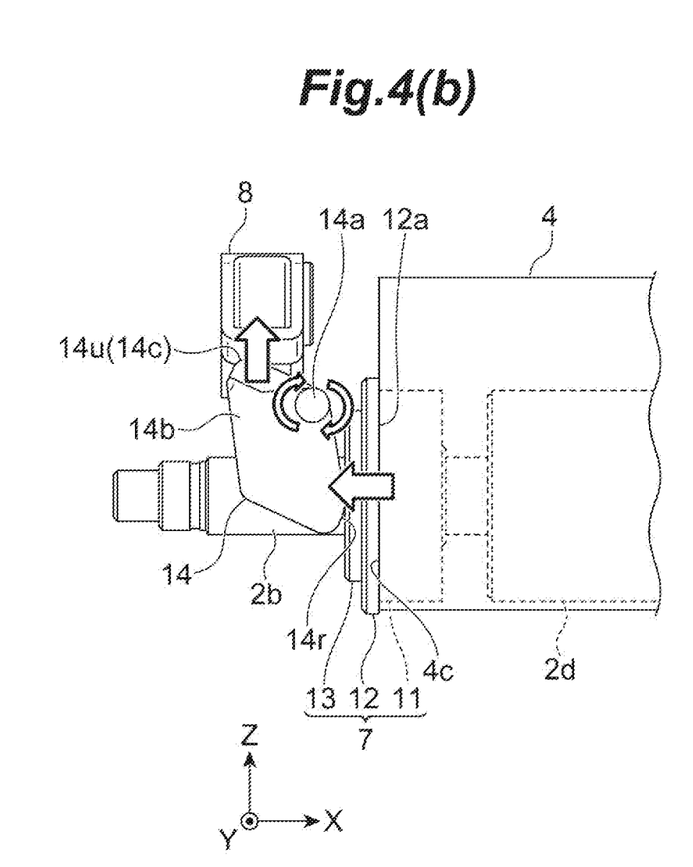
FIG. 4(b) is a side view of the example end part structure illustrated in a second operational state.

With reference to FIGS. 4(a) and 4(b), the pulley 7 includes a cylindrical portion 11, a flange portion 12, and a small diameter portion 13. The outer diameter of the cylindrical portion 11 is substantially the same as the outer diameter of the roller body 2d of the tension roller 2. The outer circumferential surface of the cylindrical portion 11 can come into contact with the inner circumferential surface of the endless belt 4. The flange portion 12 protrudes outwardly in relation to the outer circumferential surface of the endless belt 4 in the radial direction. An inner surface 12a of the flange portion 12 faces an end surface 4c of the endless belt 4 in the X direction and can come into contact with the end surface 4c. The inner surface 12a of the flange portion 12 is a surface oriented inwardly in the extension direction of the axis L2 of the tension roller 2 and is oriented toward the endless belt 4. The small diameter portion 13 is a cylindrical portion having a diameter smaller than a diameter of the cylindrical portion 11, and protrudes outwardly in the X direction. When the endless belt 4 moves in a direction of pressing the flange portion 12, the inner surface 12a of the flange portion 12 receives a force from the end surface 4c of the endless belt 4 and the pulley 7 moves in a direction along the rotation shaft 2b, e.g., a direction of the adjustment member 14 (FIG. 4(b)).

Figure 6A:
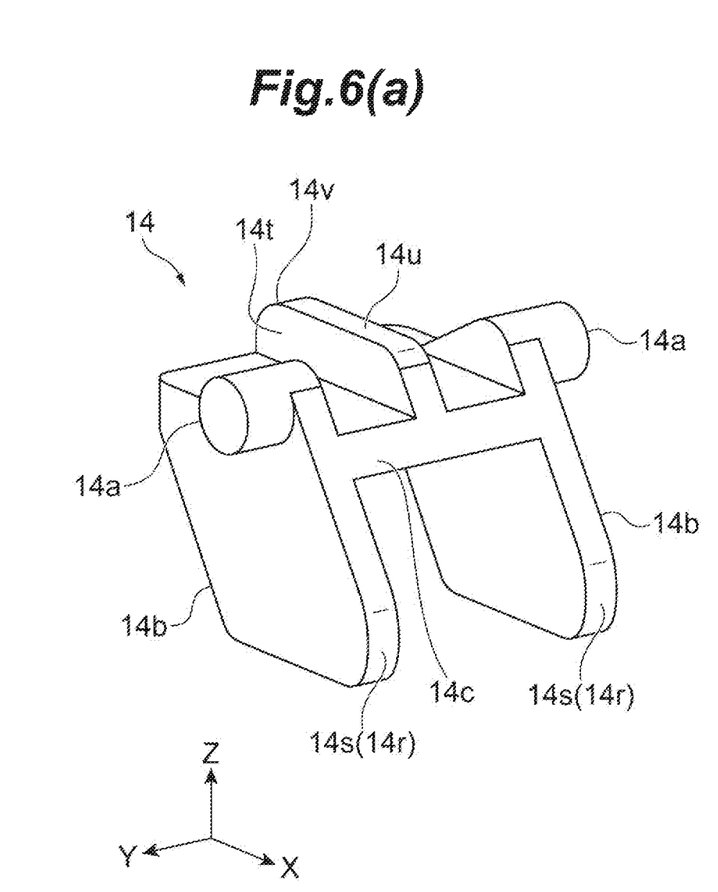
FIG. 6(a) is a schematic perspective view of example an adjustment member.
Figure 6B:
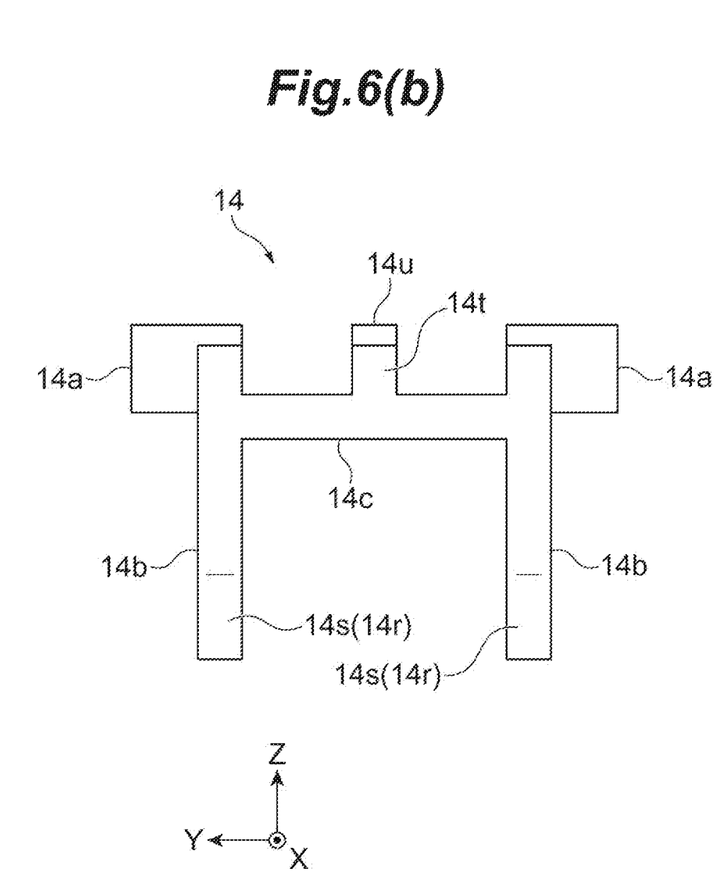
FIG. 6(b) is a schematic front view of the example adjustment member.

With reference to FIGS. 3, 6(a), and 6(b), the adjustment member 14 may include a pair of pivot portions 14a and 14a, a pair of rotation portions 14b and 14b (first rotation portions), and a communication device (also referred to herein as an intermediate device) 14c. Each of the pair of pivot portions 14a and 14a may include a rotation shaft of the corresponding rotation portion 14b and may be supported by a pivot support portion 140 (FIG. 3) provided in the periphery of the adjustment member 14. The pivot portion 14a rotates the adjustment member 14 when the pulley 7 moves in a direction along the rotation shaft 2b. The pivot portions 14a and 14a face each other in the Y direction and respectively extend in the Y direction.

In some examples, the rotation portions 14b and 14b face each other in the Y direction so that the rotation shaft 2b of the tension roller 2 is interposed therebetween and rotates about the corresponding pivot portion 14a as a rotation shaft. The rotation portion 14b is connected to the pivot portion 14a at an upper end portion thereof. The rotation portion 14b includes a first contact surface 14r (a contact surface) provided at a lower end portion thereof. The first contact surface 14r is a portion which contacts the pulley 7. The adjustment member 14 may contact the pulley 7 in the first contact surface 14r of each of the pair of rotation portions 14b and 14b. The first contact surface 14r includes a first curved surface 14s which contacts the pulley 7 in a slidable manner.

In some examples, the intermediate device 14c extends in the Y direction so as to communicate with the upper end portions of the pair of rotation portions 14b and 14b. The intermediate device 14c includes a wall portion 14t which is formed uprightly in the Z direction at the center portion in the Y direction. An upper end surface of the wall portion 14t of the intermediate device 14c is a second contact surface 14u which contacts the link mechanism 8. Accordingly, the adjustment member 14 and the link mechanism 8 are in direct contact with each other without any structure therebetween. A part of the second contact surface 14u, specifically, a region near the outer end of the second contact surface 14u in the X direction is formed as a second curved surface 14v which contacts the link mechanism 8 in a slidable manner. With reference to FIG. 4(a), the second contact surface 14u is disposed at the side opposite to the first contact surface 14r with respect to the pivot portion 14a and functions as a lever for operating the link mechanism 8. A length from the pivot portion 14a to the corresponding first contact surface 14r is longer than a length from the pivot portion 14a to the second contact surface 14u.

According to examples, the adjustment member 14 is supported to rotate by receiving a force in which the endless belt 4 moves in the longitudinal direction of the rotation shaft 2b and generates a pressing force involving the tilting motion of the steering roller 6 in accordance with a rotational motion. For example, the adjustment member 14 is rotatably supported so that a linear motion of the endless belt 4 along the longitudinal direction of the rotation shaft 2b is converted into a rotational motion and operates the link mechanism 8 by the rotational motion. For example, the adjustment member 14 may rotate to press up the link mechanism 8. With reference to FIG. 4(a), in a state before the pulley 7 moves in a direction along the rotation shaft 2b (e.g., a direction of the adjustment member 14) (also referred to herein as a "normal state"), the adjustment member 14 does not rotate, is in contact with the small diameter portion 13 of the pulley 7 at the first contact surface 14r of the rotation portion 14b, and is in contact with the link mechanism 8 at the second contact surface 14u of the intermediate device 14c. With reference to FIG. 4(b), when the pulley 7 moves (e.g., moves linearly) in a direction along the rotation shaft 2b (e.g., a direction of the adjustment member 14) as the endless belt 4 moves in a meandering manner from this state, the small diameter portion 13 of the pulley 7 presses the first contact surface 14r and the rotation portion 14b rotates by using the pivot portion 14a as a rotation shaft (also referred to herein as a "rotation state"). Accordingly, the second contact surface 14u of the intermediate device 14c may press up against (e.g., lift) the link mechanism 8. In this way, the second contact surface 14u directs a force applied by the linear motion of the first contact surface 14r to a direction different from the linear motion so that the link mechanism 8 is operated (e.g., moves) in a different direction. In a state in which the second contact surface 14u presses up the link mechanism 8, the second contact surface 14u and the link mechanism 8 are separated from each other.

The link mechanism 8 is operably connected to the steering roller 6 and may tilt the steering roller 6. For example, the link mechanism 8 tilts the steering roller 6 to weaken the tension of the endless belt 4 at the rotation shaft 6b of the steering roller 6 (e.g. a first end of the steering rotation shaft illustrated in FIG. 1) and the tension of the endless belt 4 becomes strong at the rotation shaft 6c of the steering roller 6 (e.g., a second end of the steering rotation shaft illustrated in FIG. 1). The link mechanism 8 is coupled between the adjustment member 14 and the steering roller 6, to transmit a motion of the adjustment member 14 to the steering roller 6. For example, the link mechanism 8 may be disposed to connect the adjustment member 14 and the steering roller 6 in order to transmit the motion of the adjustment member 14 to the steering roller 6. With reference to FIG. 3, the link mechanism 8 may include a fulcrum portion 8a, a receiving portion 8b, a continuous portion 8c, and a pressing portion 8d. The fulcrum portion 8a is supported by a support shaft 18 fixed to the frame 10. The support shaft 18 is disposed between the tension roller 2 and the steering roller 6 in the Y direction and extends in the X direction. The fulcrum portion 8a is provided with an opening through which the support shaft 18 is inserted and the support shaft 18 is inserted through the opening. The fulcrum portion 8a is rotatable about the support shaft 18.

The receiving portion 8b is connected to the fulcrum portion 8a and protrudes outwardly in the Y direction. The receiving portion 8b extends to a position coming into contact with the second contact surface 14u of the intermediate device 14c of the adjustment member 14. In the normal state, the receiving portion 8b contacts with the second contact surface 14u (e.g., the second curved surface 14v). The receiving portion 8b rises (in the Z direction) as the intermediate device 14c of the adjustment member 14 moves in the Z direction. When the intermediate device 14c moves upward, the receiving portion 8b moves upward in an interlocking manner.

The continuous portion 8c is connected to the fulcrum portion 8a and extends inwardly in the Y direction (toward the rotation shaft 6b). The continuous portion 8c extends to the side opposite to the receiving portion 8b in the Y direction. The continuous portion 8c extends to a position above the rotation shaft 6b of the steering roller 6. The continuous portion 8c swings (e.g., rotates) as the fulcrum portion 8a rotates. The pressing portion 8d is provided at a front end of the continuous portion 8c (e.g., an end portion opposite to a connection position with the fulcrum portion 8a). The pressing portion 8d moves downward when the continuous portion 8c swings so that the rotation shaft 6b of the steering roller 6 is pressed and the rotation shaft 6b is pressed down. In some examples, the pressing portion 8d does not necessarily directly press the rotation shaft 6b. For example, an accommodation portion or the like provided in the periphery of the rotation shaft 6b may be pressed to indirectly press the rotation shaft 6b and to press down the rotation shaft 6b.

In operation, power is transmitted to the endless belt 4 by the tension roller 2 so that the endless belt 4 moves in a circulating manner. The tension roller 3 rotates as the endless belt 4 moves. The steering roller 6 rotates as the endless belt 4 moves.

With reference to FIG. 4(*b*), when the position of the endless belt 4 deviates to the outside in the width direction, for example, the side of the rotation shaft 2b, the end surface 4c of the endless belt 4 presses against the inner surface 12a of the flange portion 12 of the pulley 7. When the pulley 7 is pressed by the endless belt 4, the pulley 7 moves outwardly, the small diameter portion 13 of the pulley 7 presses the first contact surface 14r of the adjustment member 14, and the rotation portion 14b of the adjustment member 14 rotates by using the pivot portion 14a as a rotation shaft. Accordingly, the second contact surface 14u of the intermediate device 14c presses up the receiving portion 8b of the link mechanism 8 so that the link mechanism 8 swings or pivots.

Figure 5A:
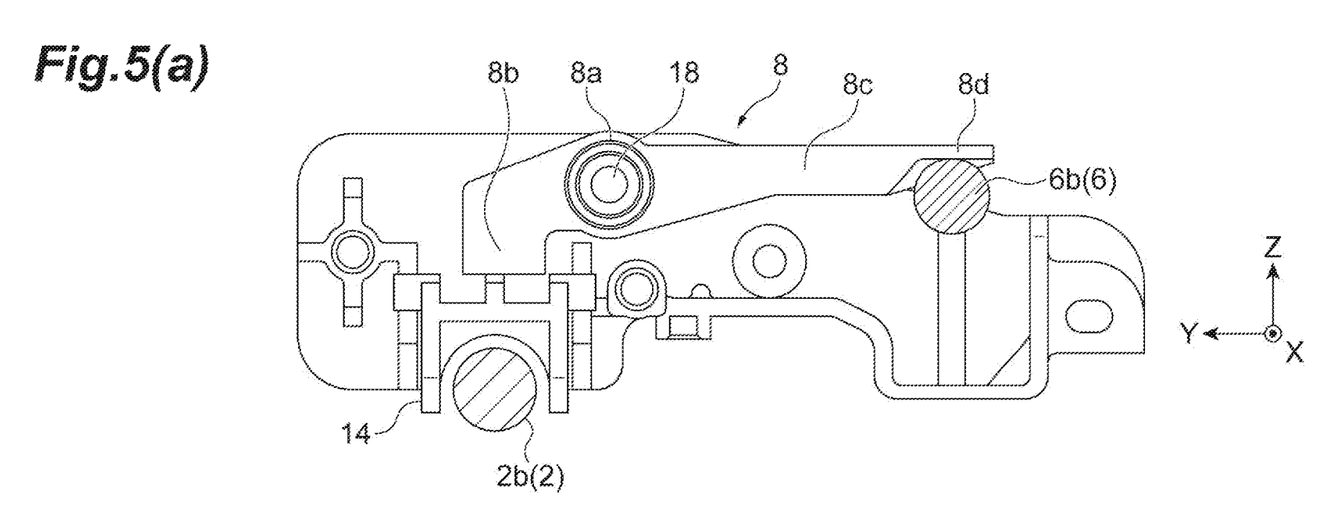
FIG. 5(a) is a cross-sectional view of the example end part structure in the first operational state.
Figure 5B:
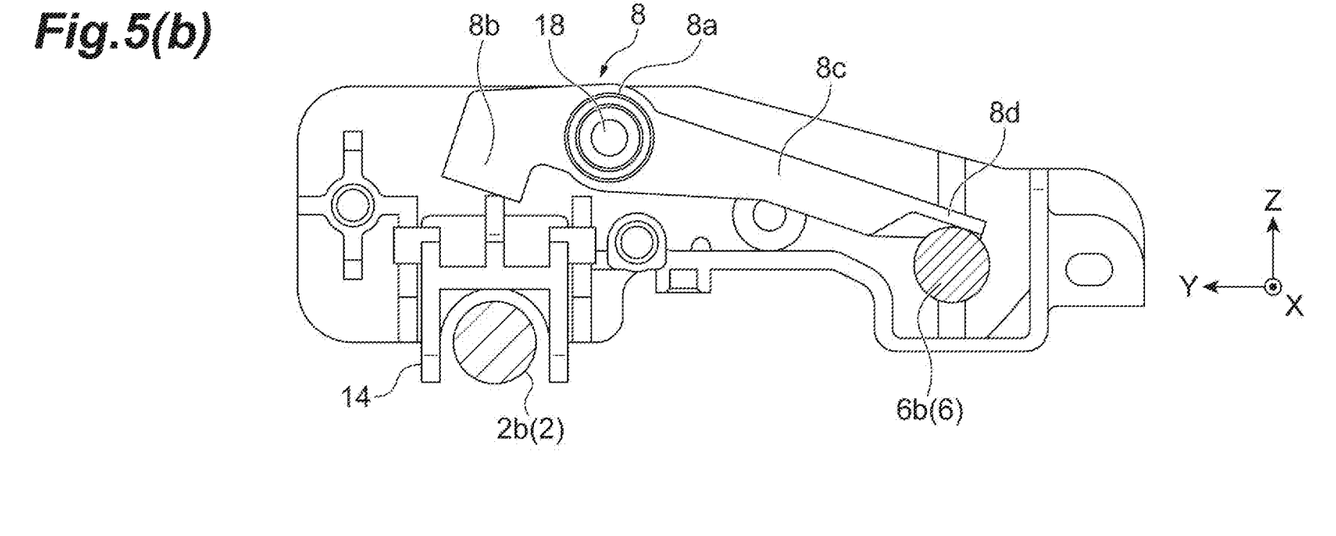
FIG. 5(b) is a cross-sectional view of the example end part structure in the second operational state.

With reference to FIG. 5(*b*), the pressing portion 8d of the link mechanism 8 is displaced downward and the rotation shaft 6b of the steering roller 6 is pressed to move downward. That is, the steering roller 6 is tilted.

When the steering roller 6 is tilted, the tension of the endless belt 4 at the rotation shaft 6b (see FIG. 1) weakens and the tension of the endless belt 4 at the rotation shaft 6c (see FIG. 1) increases. As a result, the endless belt 4 moves toward the rotation shaft 6c in the width direction so that the positional deviation of the endless belt 4 is corrected. Then, when the endless belt 4 moves toward the rotation shaft 6c, a force in which the endless belt 4 presses the pulley 7 outwardly in the X direction weakens. Accordingly, the rotation shaft 6b gradually moves upward and the pressing portion 8d of the link mechanism 8 moves upward. In accordance with this motion, the receiving portion 8b moves downward and the intermediate device 14c of the adjustment member 14 is pressed down so that the adjustment member 14 returns to the normal state. The pulley 7 is pressed back by the adjustment member 14 to return to an original position.

In some examples, the example belt driving device 1 includes the endless belt 4, the tension roller 2 which engages with the endless belt 4 and includes the rotation shaft 2b, the steering roller 6 which is separated from the tension roller 2 at the inside of the endless belt 4, the link mechanism 8 which is operably connected to the steering roller 6 and tilts the steering roller 6, and the adjustment member 14 which is rotatably supported to convert a linear motion of the endless belt 4 along the longitudinal direction of the rotation shaft 2b into a rotational motion and operates the link mechanism 8 by the rotational motion according to the linear motion of the endless belt 4.

With reference to FIG. 4(*b*), in the example belt driving device 1, the adjustment member 14 is rotatably supported so that a linear motion of the endless belt 4 along the longitudinal direction of the rotation shaft 2b is converted into a rotational motion and operates the link mechanism 8 by the rotational motion. Accordingly, since the adjustment member 14 is not operated along the rotation shaft 2b of the tension roller 2 but is operated to convert a linear motion along the rotation shaft 2b into a rotational motion, the outer circumference of the rotation shaft 2b is prevented or inhibited from increasing in size due to foreign substances such as toner and scratches occurring on the outer circumference of the rotation shaft 2b, even when the foreign substances intrude into the adjustment member 14. Since the occurrence of scratches on the outer circumference of the rotation shaft 2b is prevented or inhibited and the adjustment member 14 does not move in a linear motion along the rotation shaft 2b, the adjustment member 14 is easier to operate. When the adjustment member 14 is not operated, the meandering motion of the endless belt 4 cannot be corrected. Accordingly, when the endless belt 4 moves onto the pulley 7 or the like, a force applied to the end portion of the endless belt 4 increases, and the endless belt 4 may be damaged. Accordingly, the example adjustment member 14 is more easily operated, to inhibit damage of the endless belt 4.

In some examples, the adjustment member 14 is spaced apart from the rotation shaft 2b to avoid a contact with the rotation shaft 2b, in order to more reliably prevent an occurrence scratches on the outer circumference of the rotation shaft 2b by foreign mater that may enter the adjustment member 14.

In some examples, the belt driving device 1 includes the pulley 7 which is attached to the rotation shaft 2b of the tension roller 2 and engages with the endless belt 4. The adjustment member 14 includes the first contact surface 14r contacting the pulley 7 and the pivot portion 14a rotated in response to the movement of the pulley 7 (e.g., the pulley 7 moves in the longitudinal direction of the rotation shaft 2b), to more reliably generate a rotational motion according to the linear motion of the endless belt 4.

In some examples, the first contact surface 14r is formed at the lower end of the adjustment member 14. Accordingly, it is possible to considerably increase a distance between the pivot portion 14a and the first contact surface 14r and to gently displace the link mechanism 8 with respect to the rotational motion of the adjustment member 14, in order to improve a control of the example belt driving device 1.

In some examples, the adjustment member 14 includes the second contact surface 14u which contacts the link mechanism 8 and the second contact surface 14u is disposed at the side opposite to the first contact surface 14r with respect to the pivot portion 14a and constitutes a lever for operating the link mechanism 8. The second contact surface 14u is provided at the side opposite to the first contact surface 14r and contacts the link mechanism 8 to function as a lever (a ladder), in order to improve an operation of the link mechanism.

In some examples, the first contact surface 14r includes the first curved surface 14s which slidably contacts the pulley 7 and the second contact surface 14u includes the second curved surface 14v which slidably contacts the link mechanism 8, in order to more smoothly operate the link mechanism 8 in response to a meandering motion of the endless belt 4.

In some example the belt driving devices 1, a length from the pivot portion 14a to the first contact surface 14r of the adjustment member 14 is longer than a length from the pivot portion 14a to the second contact surface 14u to more gently displace the link mechanism 8 with respect to the rotational motion of the adjustment member 14, thereby improving the control of the belt driving device 1.

In some examples, the adjustment member 14 rotates to press up the link mechanism 8. Accordingly, since a connection position (the pressing portion 8d) with the steering roller 6 in the link mechanism 8 is tilted downward, the tension of the endless belt 4 at the connection position (the rotation shaft 6b) becomes weak, whereas the tension of the endless belt 4 at the rotation shaft 6c becomes strong. Consequently, the endless belt 4 moves in a direction in which the link mechanism 8 does not exist in the width direction and hence the correction of the positional deviation (the meandering) of the endless belt 4 is improved.

In some examples, the adjustment member 14 includes the pair of rotation portions 14b and 14b to rotate the rotation shaft 2b therebetween, in order to improve the stability (reliability) of the rotational motion as compared with a case in which a single structure performs a rotational motion and to improve the durability of the adjustment member 14.

In some examples, the adjustment member 14 and the link mechanism 8 are in direct contact with each other to more reliably operate the link mechanism 8 by the adjustment member 14.

In some examples, the steering roller 6 includes the rotation shaft 6b and the link mechanism 8 tilts the steering roller 6 so that the tension of the endless belt 4 at the rotation shaft 6b decreases and the tension of the endless belt 4 at the rotation shaft 6c increases. Accordingly, the endless belt 4 moves in a direction in which the link mechanism 8 does not exist in the width direction and hence a correction of the positional deviation (the meandering) of the endless belt is improved.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 7A:
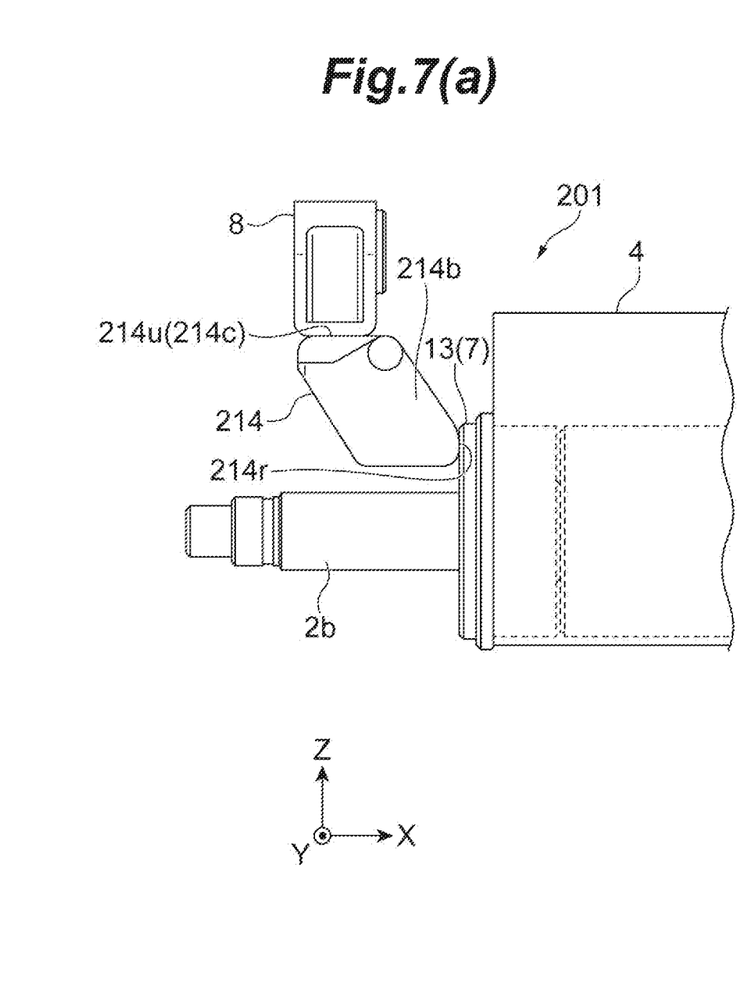
FIG. 7(a) is a side view of an example end part structure of an example belt driving device, where the end part structure is illustrated in one operational state.
Figure 7B:
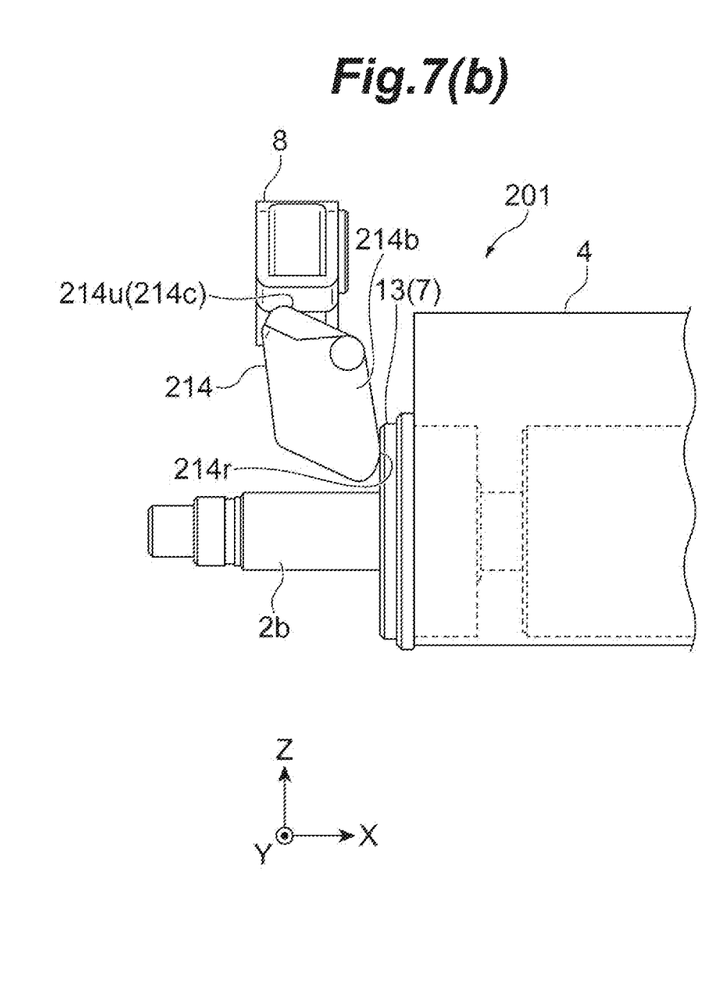
FIG. 7(b) is a side view of an example end part structure of an example belt driving device, where the end part structure is illustrated in another operational state.

For example, although the example belt driving device 1 has an adjustment member 14 that includes the pair of rotation portions 14b and 14b provided with the rotation shaft 2b interposed therebetween, this arrangement may be modified. For example, similarly to the example belt driving device 201 illustrated in FIGS. 7A and 7B, an adjustment member 214 may include a rotation portion 214b (e.g., a second rotation portion) which is provided above the rotation shaft 2b of the tension roller 2 to perform a rotational motion. As illustrated in FIG. 7(a), in the normal state, the adjustment member 214 does not perform a rotational motion, is in contact with the small diameter portion 13 of the pulley 7 at the first contact surface 214r of the rotation portion 214b, and in contact with the link mechanism 8 at the second contact surface 214u of the intermediate device 214c. When the pulley 7 moves (e.g., moves linearly) in a direction along the rotation shaft 2b (a direction of the adjustment member 214) as the endless belt 4 moves in a meandering manner as illustrated in FIG. 7(b) from this state, the small diameter portion 13 of the pulley 7 presses the first contact surface 214r. Accordingly, the rotation portion 214b is in a rotation state so that the second contact surface 214u of the intermediate device 214c presses up the link mechanism 8. Since foreign substances such as toner may easily collect at the lower side, it is possible to prevent foreign substances such as toner from being mixed inside the adjustment member 214 by providing the adjustment member 214 above the rotation shaft 2b. In addition, in the example belt driving device 1, the adjustment member 14 may operate the link mechanism 8 and the link mechanism 8 may tilt the steering roller 6. In modified examples, the steering roller 6 may be tilted by the rotation of the adjustment member without providing the link mechanism.

The invention claimed is:

1. A driving apparatus for an imaging system, comprising:
an endless belt having an inner side;
a belt roller to engage with the endless belt, the belt roller having a rotation shaft;
a steering member to contact the endless belt at the inner side of the endless belt; and
an adjustment member supported rotatably, the adjustment member to receive a force in response to the endless belt moving in a longitudinal direction of the rotation shaft of the belt roller, and to generate a pressing force that tilts the steering member via a rotational movement of the adjustment member,
wherein a rotation axis of the rotational movement of the adjustment member is perpendicular to a rotation axis of the rotation shaft.

2. The driving apparatus according to claim 1, comprising:
a link mechanism operably coupled to the steering member to tilt the steering member, the adjustment member to actuate the link mechanism by the rotational movement, in response to a linear movement of the endless belt in the longitudinal direction of the rotation shaft.

3. The driving apparatus according to claim 2, comprising:
a transmission member mounted on the rotation shaft of the belt roller to engage with the endless belt,
wherein the adjustment member includes a contact surface to contact the transmission member and a pivot portion to rotate the adjustment member when the transmission member moves in the longitudinal direction of the rotation shaft.

4. The driving apparatus according to claim 3,
wherein the contact surface of the adjustment member is located at a lower end of the adjustment member.

5. The driving apparatus according to claim 3,
wherein the contact surface is a first contact surface,
wherein the adjustment member includes a second contact surface to contact the link mechanism, and
wherein the second contact surface is located opposite to the first contact surface with respect to the pivot portion to form a lever to actuate the link mechanism.

6. The driving apparatus according to claim 5,
wherein the first contact surface includes a first curved surface to slidably contact the transmission member, and
wherein the second contact surface includes a second curved surface to slidably contact the link mechanism.

7. The driving apparatus according to claim 5,
wherein a length from the pivot portion to the first contact surface in the adjustment member is longer than a length from the pivot portion to the second contact surface.

8. The driving apparatus according to claim 2, wherein the adjustment member includes:
a pivot portion to rotatably support the adjustment member;
a pair of first rotation portions adjacent the rotation shaft of the belt roller, the pair of first rotation portions to rotate about the pivot portion in response to a displacement of the endless belt in the longitudinal direction of the rotation shaft; and
a second rotation portion located above the rotation shaft and opposite the pair of first rotation portions relative to the pivot portion, the second rotation portion to lift the link mechanism in response to the rotation of the pair of first rotation portions.

9. The driving apparatus according to claim 1,
wherein the steering member includes a steering rotation shaft having a first end and a second end opposite the first end,
the steering member being tiltable to decrease a tension of the endless belt adjacent the first end of the steering rotation shaft and to increase the tension of the endless belt adjacent the second end of the steering rotation shaft.

10. The driving apparatus according to claim 1, comprising:
a driven roller to rotate as the endless belt moves in a circulating manner,
wherein the endless belt is stretched around the belt roller and the driven roller, and
wherein the steering member is located between the belt roller and the driven roller.

11. A driving apparatus for an imaging system comprising:
an endless belt having an inner side opposite an outer side;
a belt roller to engage with the endless belt, the belt roller including a rotation shaft;
a steering member to contact the inner side of the endless belt;
a link mechanism operably coupled to the steering member to tilt the steering member;
a transmission member mounted to the rotation shaft of the belt roller, to engage with the endless belt; and
an adjustment member rotatably supported by a pivot portion to operate the link mechanism,
wherein the adjustment member includes:
a first contact surface to contact the transmission member, the first contact surface to move in response to a linear movement of the transmission member along a longitudinal direction of the rotation shaft, and
a second contact surface to redirect a force applied by the linear movement of the first contact surface in a different direction from the linear movement to actuate the link mechanism in the different direction via the second contact surface,
wherein a rotation axis of a rotational movement of the adjustment member is perpendicular to a rotation axis of the rotation shaft.

12. An imaging system comprising:
an endless belt:
a belt roller to engage with the endless belt, the belt roller including a rotation shaft;
a steering member located within the endless belt, to contact the endless belt;
a link mechanism operably coupled to the steering member, to tilt the steering member; and
an adjustment member that is rotatably supported to convert a linear movement of the endless belt along the longitudinal direction of the rotation shaft into a rotational movement, to actuate the link mechanism in response to the linear movement of the endless belt,
wherein a rotation axis of the rotational movement of the adjustment member is perpendicular to a rotation axis of the rotation shaft.

13. The imaging system according to claim 12, comprising a transmission member mounted on the rotary shaft of the belt roller, to engage the endless belt,
wherein the adjustment member comprises:
a contact surface to engage the transmission member, and
a pivot support to impart the rotational movement of the adjustment member when the transmission member moves in the longitudinal direction.

14. The imaging system according to claim 13, wherein the contact surface is a first contact surface, wherein the adjustment member includes a second contact surface to engage the link mechanism, and wherein the second contact surface is located opposite the first contact surface relative to the pivot support to form a lever to actuate the link mechanism.

15. The imaging system according to claim 14, wherein the first contact surface includes a first planar portion, wherein the second contact surface includes a second planar portion, and wherein the first planar portion and the second planar portion are angularly offset to redirect a force applied on the first contact surface to a different direction via the second contact surface.

* * * * *